US009124692B2

(12) United States Patent  
Bhargava

(10) Patent No.: US 9,124,692 B2  
(45) Date of Patent: Sep. 1, 2015

(54) SYSTEM AND METHOD FOR OPTIMIZING COMMUNICATION

(76) Inventor: Adesh Bhargava, Springfield, VA (US)

( * ) Notice: Subject to any disclaimer, the term of this patent is extended or adjusted under 35 U.S.C. 154(b) by 624 days.

(21) Appl. No.: 13/086,391

(22) Filed: Apr. 14, 2011

(65) Prior Publication Data

US 2012/0096095 A1    Apr. 19, 2012

Related U.S. Application Data

(60) Provisional application No. 61/323,973, filed on Apr. 14, 2010.

(51) Int. Cl.
*G06F 15/16* (2006.01)
*H04M 3/42* (2006.01)
*H04L 29/06* (2006.01)
*H04L 12/58* (2006.01)

(52) U.S. Cl.
CPC ..... *H04M 3/42374* (2013.01); *H04L 29/06523* (2013.01); *H04L 51/14* (2013.01); *H04L 51/043* (2013.01); *H04L 51/066* (2013.01); *H04M 3/42348* (2013.01); *H04M 3/42382* (2013.01); *H04M 2203/2072* (2013.01); *H04M 2242/30* (2013.01)

(58) Field of Classification Search
CPC ................ H04L 29/06523; H04L 29/08954; H04L 12/40143; H04L 65/80
USPC .......... 709/223, 225, 206, 228; 370/329, 352, 370/465; 342/357.28; 455/404.1, 456.2, 455/412.2, 414.1, 435.2; 705/7; 379/114.01, 142.07, 140, 211.01, 379/88.13, 88.16; 714/798

See application file for complete search history.

(56) References Cited

U.S. PATENT DOCUMENTS

| | | | |
|---|---|---|---|
| 7,382,868 B2 * | 6/2008 | Moore et al. ............. | 379/114.01 |
| 7,587,482 B2 * | 9/2009 | Henderson et al. ........... | 709/223 |
| 7,702,733 B2 * | 4/2010 | Fleck et al. .................... | 709/206 |
| 7,778,625 B2 * | 8/2010 | Yamauchi et al. ......... | 455/404.1 |
| 7,885,390 B2 * | 2/2011 | Chaudhuri et al. ........ | 379/88.16 |
| 7,994,970 B2 * | 8/2011 | Kawaguchi et al. ..... | 342/357.28 |
| 8,194,600 B2 * | 6/2012 | Nagaraja ....................... | 370/329 |
| 2001/0025248 A1 * | 9/2001 | Nihei ................................ | 705/7 |
| 2004/0127197 A1 * | 7/2004 | Roskind ..................... | 455/412.2 |
| 2005/0018820 A1 * | 1/2005 | Chaddha et al. ........... | 379/88.13 |
| 2005/0136897 A1 * | 6/2005 | Praveenkumar et al. .. | 455/414.1 |
| 2006/0156209 A1 * | 7/2006 | Matsuura et al. ............. | 714/798 |
| 2006/0285674 A1 * | 12/2006 | Le Creff et al. .......... | 379/211.01 |
| 2007/0104218 A1 * | 5/2007 | Hassan et al. .................. | 370/465 |
| 2007/0130338 A1 * | 6/2007 | Malik et al. .................... | 709/225 |
| 2008/0214191 A1 * | 9/2008 | Yach et al. ................... | 455/435.2 |
| 2008/0254810 A1 * | 10/2008 | Fok et al. ..................... | 455/456.2 |
| 2008/0317007 A1 * | 12/2008 | Chaar et al. .................... | 370/352 |
| 2009/0003569 A1 * | 1/2009 | Forbes et al. ............. | 379/142.07 |
| 2009/0047922 A1 * | 2/2009 | Buckley et al. ............. | 455/404.1 |
| 2010/0002859 A1 * | 1/2010 | Hepworth et al. ............ | 379/140 |
| 2010/0124196 A1 * | 5/2010 | Bonar et al. .................. | 370/329 |

* cited by examiner

*Primary Examiner* — Dustin Nguyen

(57) ABSTRACT

An optimal communication system may include an optimal communication module, executed by a computer system, to ascertain a first and second user's available modes of communication. A first user communication system may allow the first user to link a communication criterion with a preferred mode of communication. A second user communication system may allow the second user to send a message to the first user by the first user's preferred mode of communication.

22 Claims, 6 Drawing Sheets

SYSTEM AND METHOD FOR OPTIMIZING COMMUNICATION

CROSS-REFERENCE TO RELATED APPLICATION(S)

This application claims the benefit of Provisional Patent Application U.S. Ser. No. 61/323,973, filed Apr. 14, 2010, which is expressly incorporated herein by reference.

BACKGROUND

Electronic communication can often be a trial and error endeavor. In the case of an emergency, such a trial and error endeavor can lead to grave consequences. Such trial and error communication can also have adverse affects on bandwidth usage, and general wastage of time spent on unnecessary communication, loss of productivity, and failure to ultimately communicate. When optimally used however, electronic communication can be a source of efficient and reliable exchange of ideas and information.

One reason for inefficient communication generally involves guesswork on a user's part on how to communicate with the intended recipient. For example, an individual may know a friend is generally available via phone during evening hours, but during the day, the same friend may only be available via text or e-mail. In the case of an emergency, a phone call to such a friend during the day would not be the optimal way to communicate. Alternatively, during local travel, the same friend may only be available via text or phone, but during international travel, the same friend may prefer to be available via e-mail due to the higher charges applicable to international phone and text communication.

As each wireless communication uses a certain amount of bandwidth, it becomes evident that millions of such wireless communications and inefficient wireless communications have a negative affect on bandwidth availability and usage.

SUMMARY

An Optimal Communication System (hereinafter "OC system") may include an Optimal Communication module (hereinafter "OC module") that accounts, for example, for a set of preferences and rankings of how people like to communicate and be communicated with. The OC module may include a set of inputs that may allow a user's preferences and contact information to be entered. Based on the type of message (e.g. general, important, emergency, personal, social etc.), a user may simply enter the message and the OC system may communicate with the recipient in a predetermined manner to best reach the recipient. The communication may be set on an automated mode where a user enters a message and the OC module automatically forwards the message based on the sender's and recipient's preferences and settings, or a manual mode where a user may select the mode of communication with the recipient.

In an example, a general message may be sent to a user's e-mail, whereas an emergency message may be automatically sent via text, or even to a user's emergency contact, which in an embodiment, may be unknown to the user. For example, in an employment setting, in an emergency situation, a staff member may enter a message in the OC system, and the OC module may automatically send out the communication via one or more methods as prescribed by the sender and/or recipient. As discussed herein, in an embodiment, the emergency contact information may be hidden for privacy purposes.

In an embodiment, the OC system may include key-word search capability at the recipient's level to allow predetermined communication methods based on the recipient's preferences, regardless of the sender's method of communication.

The OC system may be part of an I-PHONE or general PDA (personal digital assistant) application that may allow a user to automatically send messages via communication media such as e-mail, text, FACEBOOK or other media, depending on a user's or recipient's preferences.

In an embodiment, an optimal communication system may include an optimal communication module to ascertain a sender's and recipient's available modes of communication, a recipient communication system to allow a message recipient to link at least one communication criterion with a preferred mode of communication, and a sender communication system to allow a sender to send a message to the recipient by means of the recipient's preferred mode(s) of communication.

For the optimal communication system described above, in an embodiment, the optimal communication module may allow real-time ascertaining of a sender's and recipient's available modes of communication and/or real-time adjustment of system parameters based on changes in the sender's and recipient's communication system parameters. In an embodiment, the optimal communication system may allow real-time adjustment of system parameters based on changes in optimal communication module parameters. In another embodiment, the optimal communication module may automatically ascertain a user's (e.g. sender's/recipient's) modes of communication, or alternatively, the optimal communication module may manually ascertain a user's modes of communication by allowing a user to select a mode of communication from a predetermined list of communication options. In an embodiment, the communication criterion may include a time of communication, or alternatively, the communication criterion may include a recipient's location. In an embodiment, the communication criterion may include a recipient's relationship with the sender, or alternatively, the communication criterion may include a recipient specific preference (e.g. a recipient defined preference). In an embodiment, the communication criterion may generally include a sender's specific preference.

For the optimal communication system described above, in an embodiment, the sender communication system may allow the sender to automatically send a message to the recipient by means of the recipient's preferred mode(s) of communication. In an embodiment, the recipient communication system may allow the recipient to limit a sender's ability to send a message by means of only the recipient's preferred mode of communication. In an embodiment, the sender communication system may allow the sender to manually send a message to the recipient regardless of the recipient's preferred mode of communication. In another embodiment, the modes of communication may include e-mail, text, voicemail, and generally, wireless and/or wired communication. In an embodiment, the recipient communication system may allow ranking of the recipient's modes of communication. In another embodiment, the optimal communication module may allow automated ranking of a message based on contents of the message. Alternatively, the optimal communication module may allow categorization of a message based on contents of the message. Alternatively, the optimal communication module may allow categorization of a message based on contents of the message, for example, as general, important, emergency, personal or social message.

For the optimal communication system described above, in an embodiment, specifics of the recipient's modes of communication may be hidden from the sender. In an embodiment, the system may be part of an I-PHONE application, or generally, a PDA application. In an embodiment, the system may be a PDA application, or alternatively, a computer application. In an embodiment, the system may allow cross-communication with at least two communication applications.

For the optimal communication system described above, in an embodiment, the system may allow optimal communication based on available bandwidth. Alternatively, the system may allow optimal communication based on minimal bandwidth usage. In an embodiment, the system may allow optimal communication based on minimal power usage of the sender's and/or recipient's communication devices. In an embodiment, the system may further include a voice transcription system to allow the recipient to receive text of a voice format message sent by the sender. In an embodiment, the system may include a voice system to allow the recipient to receive a voice message of a text format message sent by the sender. In an embodiment, the system may further include sound, visual stimulation, vibration and/or an electrical signal associated with a message sent by the sender. In an embodiment, the optimal communication module may allow association of sound, visual stimulation, vibration and/or an electrical signal by the recipient with a ranking of a message sent by the sender. In an embodiment, the system may allow a sender to view a recipient's preferred modes of communication. Alternatively, the system may allow a sender to view a recipient's ranked preferred modes of communication prior to sending a message based on contents of the message. In an embodiment, the system may allow a sender to view a recipient's ranked preferred modes of communication prior to sending a message based on a sender's relationship with the recipient. In an embodiment, the system may automatically forward a further message via a lower ranked recipient preferred mode of communication if the recipient does not acknowledge receipt of an initial message.

For the optimal communication system described above, in an embodiment, the system may use GPS or another locating technology to monitor location of the sender and/or recipient, and/or movement of the sender and/or recipient. In an embodiment, the system may monitor sound in an area around the sender and/or recipient, and/or light in an area around the sender and/or recipient, and/or an altitude of the sender and/or recipient. In an embodiment, the system may monitor BLUETOOTH operation of a PDA device using the system, and/or if a PDA device using the system is lost or dead.

In an embodiment, an optimal communication system may include an optimal communication module to ascertain a first and second user's available modes of communication, a first user communication system to allow the first user to link at least one communication criterion with a preferred mode of communication, and a second user communication system to allow the second user to send a message to the first user by means of the first user's preferred mode(s) of communication.

For the optimal communication system described above, in an embodiment, the optimal communication module may allow real-time ascertaining of a first and second user's available modes of communication and/or real-time adjustment of system parameters based on changes in the first and second user's communication system parameters. In an embodiment, the optimal communication system may allow real-time adjustment of system parameters based on changes in optimal communication module parameters. In another embodiment, the optimal communication module may automatically ascertain a user's modes of communication. In an embodiment, the optimal communication module may manually ascertain a user's modes of communication by allowing a user to select a mode of communication from a predetermined list of communication options. In an embodiment, the communication criterion may include a time of communication, or alternatively, the communication criterion may include a first user's location. In an embodiment, the communication criterion may include a first user's relationship with the second user. Alternatively, the communication criterion may include a first user specific preference as defined by the first user, and in another embodiment, the communication criterion may include a second user specific preference as defined by the second user.

For the optimal communication system described above, in an embodiment, the second user communication system may allow the second user to automatically send a message to the first user by means of the first user's preferred mode(s) of communication. In an embodiment, the first user communication system may allow the first user to limit a second user's ability to send a message by means of only the first user's preferred mode(s) of communication. In an embodiment, the second user communication system may allow the second user to manually send a message to the first user regardless of the first user's preferred mode(s) of communication. In another embodiment, the mode(s) of communication may, for example, include e-mail, text, voicemail, and generally, wireless and/or wired communication. In an embodiment, the first user communication system may allow ranking of the first user's modes of communication. In another embodiment, the optimal communication module may allow automated ranking of a message based on contents of the message. Alternatively, the optimal communication module may allow categorization of a message based on contents of the message. Alternatively, the optimal communication module may allow categorization of a message based on contents of the message, for example, as a general, important, emergency, personal or social message.

For the optimal communication system described above, in an embodiment, specifics of the first user's modes of communication may be hidden from the second user. In an embodiment, the system may be part of an I-PHONE application, or generally, a PDA application. In an embodiment, the system may be a PDA application, or alternatively, a computer application. In an embodiment, the system may allow cross-communication with at least two communication applications.

For the optimal communication system described above, in an embodiment, the system may allow optimal communication based on available bandwidth, or alternatively, the system may allow optimal communication based on minimal bandwidth usage. In an embodiment, the system may allow optimal communication based on minimal power usage of at least one of the second user's and first user's communication devices. In an embodiment, the system may further include a voice transcription system to allow the first user to receive text of a voice format message sent by the second user. In an embodiment, the system may further include a voice system to allow the first user to receive a voice message of text format sent by the second user. In an embodiment, the system may further include sound, visual stimulation, vibration and/or an electrical signal associated with a message sent by the second user. In an embodiment, the optimal communication module may allow association of sound, visual stimulation, vibration and/or an electrical signal by the first user with a ranking of a message sent by the second user. In an embodiment, the system may allow a second user to view a first user's preferred modes of communication. Alternatively, the system may allow a second user to view a first user's ranked preferred modes of communication prior to sending a message based on contents of the message. In an embodiment, the system may allow a second user to view a first user's ranked preferred modes of communication prior to sending a message based on a second user's relationship with the first user. In an embodiment, the system may automatically forward a further message via a lower ranked first user preferred mode of communication if the first user does not acknowledge receipt of an initial message.

For the optimal communication system described above, in an embodiment, the system may use GPS or another locating technology to monitor location of the first and/or second users, and/or movement of the first and/or second users. In an embodiment, the system may monitor sound in an area around the first and/or second users, and/or light in an area around the first and/or second users, and/or an altitude of the first and/or second users. In an embodiment, the system may monitor BLUETOOTH operation of a PDA device using the system, and/or if a PDA device using the system is lost or dead.

In an embodiment, a dynamic communication system for real-time optimization of communication between first and second system users may include an optimal communication module to ascertain a first and second user's available modes of communication, a first user communication system to allow the first user to link at least one communication criterion with a preferred mode of communication, and a second user communication system to allow the second user to send a message to the first user by means of the first user's preferred mode(s) of communication.

For the system described above, in an embodiment, the optimal communication module may allow real-time ascertaining of a first and second user's available modes of communication and/or real-time adjustment of system parameters based on changes in the first and second user's communication system parameters. In an embodiment, the system may allow real-time adjustment of system parameters based on changes in optimal communication module parameters. In another embodiment, the optimal communication module may automatically ascertain a user's modes of communication. In an embodiment, the optimal communication module may manually ascertain a user's modes of communication by allowing a user to select a mode of communication from a predetermined list of communication options. In an embodiment, the communication criterion may include a time of communication, or alternatively, the communication criterion may include a first user's location. In an embodiment, the communication criterion may include a first user's relationship with the second user. Alternatively, the communication criterion may include a first user specific preference as defined by the first user, and in another embodiment, the communication criterion may include a second user specific preference as defined by the second user.

For the system described above, in an embodiment, the second user communication system may allow the second user to automatically send a message to the first user by means of the first user's preferred mode(s) of communication. In an embodiment, the first user communication system may allow the first user to limit a second user's ability to send a message by means of only the first user's preferred mode(s) of communication. In an embodiment, the second user communication system may allow the second user to manually send a message to the first user regardless of the first user's preferred mode(s) of communication. In another embodiment, the mode(s) of communication may, for example, include e-mail, text, voicemail, and generally, wireless and/or wired communication. In an embodiment, the first user communication system may allow ranking of the first user's modes of communication. In another embodiment, the optimal communication module may allow automated ranking of a message based on contents of the message. Alternatively, the optimal communication module may allow categorization of a message based on contents of the message. Alternatively, the optimal communication module may allow categorization of a message based on contents of the message, for example, as a general, important, emergency, personal or social message.

For the system described above, in an embodiment, specifics of the first user's modes of communication may be hidden from the second user. In an embodiment, the system may be part of an I-PHONE application, or generally, a PDA application. In an embodiment, the system may be a PDA application, or alternatively, a computer application. In an embodiment, the system may allow cross-communication with at least two communication applications.

For the system described above, in an embodiment, the system may allow optimal communication based on available bandwidth, or alternatively, the system may allow optimal communication based on minimal bandwidth usage. In an embodiment, the system may allow optimal communication based on minimal power usage of at least one of the second user's and first user's communication devices. In an embodiment, the system may further include a voice transcription system to allow the first user to receive text of a voice format message sent by the second user. In an embodiment, the system may further include a voice system to allow the first user to receive a voice message of text format sent by the second user. In an embodiment, the system may further include sound, visual stimulation, vibration and/or an electrical signal associated with a message sent by the second user. In an embodiment, the optimal communication module may allow association of sound, visual stimulation, vibration and/or an electrical signal by the first user with a ranking of a message sent by the second user. In an embodiment, the system may allow a second user to view a first user's preferred modes of communication. Alternatively, the system may allow a second user to view a first user's ranked preferred modes of communication prior to sending a message based on contents of the message. In an embodiment, the system may allow a second user to view a first user's ranked preferred modes of communication prior to sending a message based on a second user's relationship with the first user. In an embodiment, the system may automatically forward a further message via a lower ranked first user preferred mode of communication if the first user does not acknowledge receipt of an initial message.

For the system described above, in an embodiment, the system may use GPS or another locating technology to monitor location of the first and/or second users, and/or movement of the first and/or second users. In an embodiment, the system may monitor sound in an area around the first and/or second users, and/or light in an area around the first and/or second users, and/or an altitude of the first and/or second users. In an embodiment, the system may monitor BLUETOOTH operation of a PDA device using the system, and/or if a PDA device using the system is lost or dead.

In an embodiment, a dynamic communication system for real-time optimization of communication between first and second system users, may include an optimal communication module to ascertain the first and second user's available modes of communication, a first user communication system to allow the first user to link at least one first communication criterion with a first mode of communication, and at least one second communication criterion with a second mode of communication to rank the modes of communication in order of preference, and a second user communication system to allow the second user to ascertain the first user's preferred mode of communication and send a message to the first user by means of the first user's preferred mode of communication.

For the system described above, in an embodiment, the optimal communication module may allow real-time ascertaining of a first and second user's available modes of communication and/or real-time adjustment of system parameters based on changes in the first and second user's communication system parameters. In an embodiment, the system may allow real-time adjustment of system parameters based on changes in optimal communication module parameters. In another embodiment, the optimal communication module may automatically ascertain a user's modes of communication. In an embodiment, the optimal communication module may manually ascertain a user's modes of communication by allowing a user to select a mode of communication from a predetermined list of communication options. In an embodiment, the communication criterion may include a time of communication, or alternatively, the communication criterion may include a first user's location. In an embodiment, the communication criterion may include a first user's relationship with the second user. Alternatively, the communication criterion may include a first user specific preference as defined by the first user, and in another embodiment, the communication criterion may include a second user specific preference as defined by the second user.

For the system described above, in an embodiment, the second user communication system may allow the second user to automatically send a message to the first user by means of the first user's preferred mode(s) of communication. In an embodiment, the first user communication system may allow the first user to limit a second user's ability to send a message by means of only the first user's preferred mode(s) of communication. In an embodiment, the second user communication system may allow the second user to manually send a message to the first user regardless of the first user's preferred mode(s) of communication. In another embodiment, the first and second modes of communication may, for example, include e-mail, text, voicemail, and generally, wireless and/or wired communication.

In an embodiment, the optimal communication module may allow automated ranking of a message based on contents of the message. Alternatively, the optimal communication module may allow categorization of a message based on contents of the message. Alternatively, the optimal communication module may allow categorization of a message based on contents of the message, for example, as a general, important, emergency, personal or social message.

For the system described above, in an embodiment, specifics of the first user's modes of communication may be hidden from the second user. In an embodiment, the system may be part of an I-PHONE application, or generally, a PDA application. In an embodiment, the system may be a PDA application, or alternatively, a computer application. In an embodiment, the system may allow cross-communication with at least two communication applications.

For the system described above, in an embodiment, the system may allow optimal communication based on available bandwidth, or alternatively, the system may allow optimal communication based on minimal bandwidth usage. In an embodiment, the system may allow optimal communication based on minimal power usage of at least one of the second user's and first user's communication devices. In an embodiment, the system may further include a voice transcription system to allow the first user to receive text of a voice format message sent by the second user. In an embodiment, the system may further include a voice system to allow the first user to receive a voice message of text format sent by the second user. In an embodiment, the system may further include sound, visual stimulation, vibration and/or an electrical signal associated with a message sent by the second user. In an embodiment, the optimal communication module may allow association of sound, visual stimulation, vibration and/or an electrical signal by the first user with a ranking of a message sent by the second user. In an embodiment, the system may allow a second user to view a first user's preferred modes of communication. Alternatively, the system may allow a second user to view a first user's ranked preferred modes of communication prior to sending a message based on contents of the message. In an embodiment, the system may allow a second user to view a first user's ranked preferred modes of communication prior to sending a message based on a second user's relationship with the first user. In an embodiment, the system may automatically forward a further message via a lower ranked first user preferred mode of communication if the first user does not acknowledge receipt of an initial message.

For the system described above, in an embodiment, the system may use GPS or another locating technology to monitor location of the first and/or second users, and/or movement of the first and/or second users. In an embodiment, the system may monitor sound in an area around the first and/or second users, and/or light in an area around the first and/or second users, and/or an altitude of the first and/or second users. In an embodiment, the system may monitor BLUETOOTH operation of a PDA device using the system, and/or if a PDA device using the system is lost or dead.

In an embodiment, a dynamic communication system for real-time optimization of communication between first and second individuals, one of the individuals being a system user and the other one of the individuals being a non-system user, the system may include an optimal communication module to ascertain the system user's available modes of communication, a first user communication system to allow the system user to link at least one first communication criterion with a first mode of communication, and at least one second communication criterion with a second mode of communication to rank the modes of communication in order of preference, and a second user communication system to allow the non-system user to ascertain the system user's preferred mode of communication and send a message to the system user by means of the system user's preferred mode of communication For the system described above, in an embodiment, the optimal communication module may allow real-time ascertaining of a system and non-system user's available modes of communication and/or real-time adjustment of system parameters based on changes in the system and non-system user's communication system parameters. In an embodiment, the system may allow real-time adjustment of system parameters based on changes in optimal communication module parameters. In another embodiment, the optimal communication module may automatically ascertain a user's modes of communication. In an embodiment, the optimal communication module may manually ascertain a user's modes of communication by allowing a user to select a mode of communication from a predetermined list of communication options. In an embodiment, the communication criterion may include a time of communication, or alternatively, the communication criterion may include a system user's location. In an embodiment, the communication criterion may include a system user's relationship with the non-system user. Alternatively, the communication criterion may include a system user specific preference as defined by the system user, and in another embodiment, the communication criterion may include a non-system user specific preference as defined by the non-system user.

For the system described above, in an embodiment, the second user communication system may allow the non-system user to automatically send a message to the system user by means of the system user's preferred mode(s) of communication. In an embodiment, the first user communication system may allow the system user to limit a non-system user's ability to send a message by means of only the system user's preferred mode(s) of communication. In an embodiment, the second user communication system may allow the non-system user to manually send a message to the system user regardless of the system user's preferred mode(s) of communication. In another embodiment, the first and second modes of communication may, for example, include e-mail, text, voicemail, and generally, wireless and/or wired communication.

In an embodiment, the optimal communication module may allow automated ranking of a message based on contents of the message. Alternatively, the optimal communication module may allow categorization of a message based on contents of the message. Alternatively, the optimal communication module may allow categorization of a message based on contents of the message, for example, as a general, important, emergency, personal or social message.

For the system described above, in an embodiment, specifics of the system user's modes of communication may be hidden from the non-system user. In an embodiment, the system may be part of an I-PHONE application, or generally, a PDA application. In an embodiment, the system may be a PDA application, or alternatively, a computer application. In an embodiment, the system may allow cross-communication with at least two communication applications.

For the system described above, in an embodiment, the system may allow optimal communication based on available bandwidth, or alternatively, the system may allow optimal communication based on minimal bandwidth usage. In an embodiment, the system may allow optimal communication based on minimal power usage of at least one of the non-system user's and system user's communication devices. In an embodiment, the system may further include a voice transcription system to allow the system user to receive text of a voice format message sent by the non-system user. In an embodiment, the system may further include a voice system to allow the system user to receive a voice message of text format sent by the non-system user. In an embodiment, the system may further include sound, visual stimulation, vibration and/or an electrical signal associated with a message sent by the non-system user. In an embodiment, the optimal communication module may allow association of sound, visual stimulation, vibration and/or an electrical signal by the system user with a ranking of a message sent by the non-system user. In an embodiment, the system may allow a non-system user to view a system user's preferred modes of communication. Alternatively, the system may allow a non-system user to view a system user's ranked preferred modes of communication prior to sending a message based on contents of the message. In an embodiment, the system may allow a non-system user to view a system user's ranked preferred modes of communication prior to sending a message based on a non-system user's relationship with the system user. In an embodiment, the system may automatically forward a further message via a lower ranked system user preferred mode of communication if the system user does not acknowledge receipt of an initial message.

For the system described above, in an embodiment, the system may use GPS or another locating technology to monitor location of the system and/or non-system users, and/or movement of the system and/or non-system users. In an embodiment, the system may monitor sound in an area around the system and/or non-system users, and/or light in an area around the system and/or non-system users, and/or an altitude of the system and/or non-system users. In an embodiment, the system may monitor BLUETOOTH operation of a PDA device using the system, and/or if a PDA device using the system is lost or dead.

In an embodiment, an optimal communication system may include an optimal communication module to ascertain a first and second user's available modes of communication, a first user communication system to allow the first user to link at least one communication criterion with a preferred mode of communication, and a second user communication system to allow the second user to send a message to the first user by means of at least one of a first and the second user's preferred mode(s) of communication.

In an embodiment, an optimal communication system may include an optimal communication module, executed by a computer system, to ascertain a first and second user's available modes of communication. A first user communication system may allow the first user to link at least one communication criterion with a preferred mode of communication. A second user communication system may allow the second user to send a message to the first user by the first user's preferred mode of communication.

For the optimal communication system described above, the optimal communication module may allow real-time ascertaining of the first and second user's available modes of communication. The optimal communication system may allow real-time adjustment of system parameters based on changes in the first and second user's communication system parameters. The optimal communication module may automatically ascertain a user's available modes of communication. The optimal communication module may manually ascertain a user's modes of communication by allowing a user to select a mode of communication from a predetermined list of communication options. The communication criterion may include a time of communication, the first user's location, the first user's relationship with the second user, the first user's specific preference, and/or the second user's specific preference. The second user communication system may allow the second user to automatically send the message to the first user by the first user's preferred mode of communication. The first user communication system may allow the first user to limit the second user's ability to send the message by only the first user's preferred mode of communication. The modes of communication may include e-mail, text, voicemail, wireless and/or wired communication. The first user communication system may allow ranking of the first user's available modes of communication. The optimal communication module may allow automated ranking of the message based on contents of the message. The system may allow optimal communication based on available bandwidth and/or minimal power usage of the first and/or second user's communication devices. The optimal communication module may allow association of a sound, visual stimulation, vibration and/or electrical signal by the first user with a ranking of the message sent by the second user. The system may allow the second user to view the first user's ranked preferred modes of communication prior to sending the message based on contents of the message. The system may automatically forward a further message via a lower ranked first user preferred mode of communication if the first user does not acknowledge receipt of an initial message. The system may prompt the second user to send the message based on the first user's preferred mode of communication. The system may use GPS or another locating technology to monitor location of the first and/or second users, and/or movement of the first and/or second users. The system may monitor sound in an area around the first and/or second users, surrounding light in the area around the first and/or second users, and/or an altitude of the first and/or second users.

In an embodiment, a dynamic communication system for real-time optimization of communication between first and second system users may include an optimal communication module, executed by a computer system, to ascertain the first and second user's available modes of communication. A first user communication system may allow the first user to link a first communication criterion with a first mode of communication, and a second communication criterion with a second mode of communication to rank the modes of communication in order of preference. A second user communication system may allow the second user to ascertain the first user's preferred mode of communication and send a message to the first user by the first user's preferred mode of communication.

In an embodiment, an optimal communication method may include ascertaining, by a computer, a first and second user's available modes of communication, allowing the first user to link a communication criterion with a preferred mode of communication, and allowing the second user to send a message to the first user by the first user's preferred mode of communication.

In an embodiment, an optimal communication method may include ascertaining of a sender's and recipient's available modes of communication, linking at least one communication criterion with a preferred mode of communication, and sending a message to the recipient by means of the recipient's preferred mode(s) of communication.

For the optimal communication method described above, in an embodiment, the method may further include providing an optimal communication module to ascertain the sender's and recipient's available modes of communication, providing a recipient communication system to allow the message recipient to link at least one communication criterion with the preferred mode of communication, and providing a sender communication system to allow the sender to send a message to the recipient by means of the recipient's preferred mode(s) of communication.

For the optimal communication method described above, in an embodiment, the method may further include real-time ascertaining of a sender's and recipient's available modes of communication. In an embodiment, the method may include real-time adjustment of system parameters based on changes in the sender's and recipient's communication system parameters. In another embodiment, the method may include real-time adjustment of system parameters based on changes in optimal communication module parameters.

For the optimal communication method described above, in an embodiment, the method may further include automatically ascertaining of a user's modes of communication. In an embodiment, the method may include manually ascertaining of a user's modes of communication by allowing a user to select a mode of communication from a predetermined list of communication options. In an embodiment, the communication criterion may include a time of communication. Alternatively, the communication criteria may include, for example, a recipient's location, a recipient's relationship with the sender, or generally, a recipient specific preference, or a sender specific preference. In an embodiment, the method may further include allowing the sender to automatically send a message to the recipient by means of the recipient's preferred mode(s) of communication. In an embodiment, the method may further include allowing the recipient to limit a sender's ability to send a message by means of only the recipient's preferred mode(s) of communication. In an embodiment, the method may further include allowing the sender to manually send a message to the recipient regardless of the recipient's preferred mode(s) of communication. The mode(s) of communication may include, for example, e-mail, text, voicemail, wireless and/or wired communication. In an embodiment, the method may further include providing ranking of the recipient's modes of communication, or alternatively, automated ranking of a message based on contents of the message. In an embodiment, the method may further include providing categorization of a message based on contents of the message. Alternatively, the method may further include providing categorization of a message based on contents of the message, for example, as a general, important, emergency, personal or social message.

For the optimal communication method described above, in an embodiment, specifics of the recipient's modes of communication may be hidden from the sender. In an embodiment, the method may be used with an I-PHONE application, or generally, a PDA or computer application. In an embodiment, the method may further include providing cross-communication with at least two communication applications. In an embodiment, the method may further include providing optimal communication based on available bandwidth, optimal communication based on minimal bandwidth usage, and/or optimal communication based on minimal power usage of at least one of the sender's and recipient's communication devices. In an embodiment, the method may further include providing a voice transcription system to allow the recipient to receive text of a voice message sent by the sender. Alternatively, the method may further include providing a voice system to allow the recipient to receive a voice message of text sent by the sender. In an embodiment, the method may further include using sound, visual stimulation, vibration and/or electrical signal associated with a message sent by the sender. In an embodiment, the method may further include providing association of a sound, visual stimulation, vibration and/or electrical signal by the recipient with a ranking of a message sent by the sender.

For the optimal communication method described above, in an embodiment, the method may further include allowing a sender to view a recipient's preferred modes of communication. In an embodiment, the method may further include allowing a sender to view a recipient's ranked preferred modes of communication prior to sending a message based on contents of the message. In an embodiment, the method may further include allowing a sender to view a recipient's ranked preferred modes of communication prior to sending a message based on a sender's relationship with the recipient. In an embodiment, the method may further include the option of automatically forwarding a further message via a lower ranked recipient preferred mode of communication if the recipient does not acknowledge receipt of an initial message.

For the method described above, in an embodiment, the method may include using GPS or another locating technology to monitor location of the sender and/or recipient, and/or movement of the sender and/or recipient. In an embodiment, the method may include monitoring sound in an area around the sender and/or recipient, and/or light in an area around the sender and/or recipient, and/or an altitude of the sender and/or recipient. In an embodiment, the method may include monitoring BLUETOOTH operation of a PDA device using the system, and/or if a PDA device using the system is lost or dead.

In an embodiment, a non-transitory computer readable medium storing machine readable instructions, that when executed by a computer system, may perform a method for optimal communication. The method may include ascertaining of a sender's and recipient's available modes of communication, linking at least one communication criterion with a preferred mode of communication, and sending a message to the recipient by means of the recipient's preferred mode(s) of communication.

Additional features, advantages, and embodiments may be set forth or apparent from consideration of the following detailed description, drawings, and claims.

BRIEF DESCRIPTION OF THE DRAWINGS

The embodiments are described in detail in the following description with reference to the following figures. In the drawings.

DETAILED DESCRIPTION OF EMBODIMENTS

Figure 1:
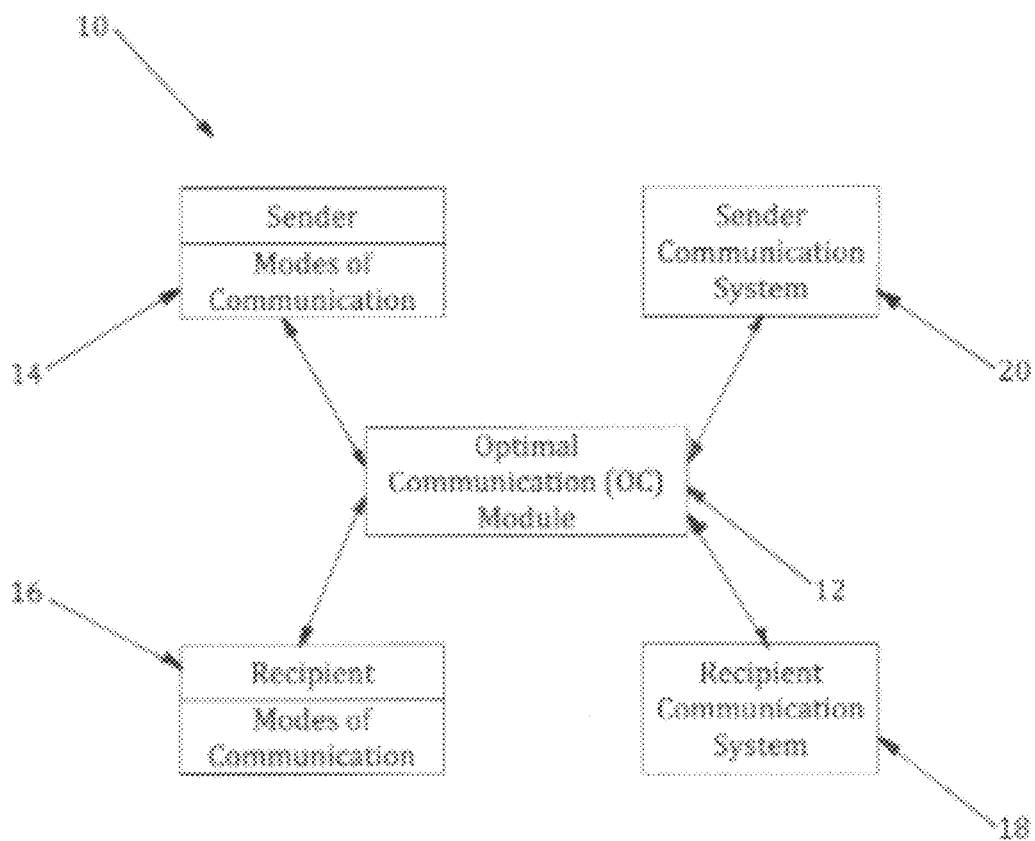
FIG. 1 is an illustration of an optimal communication system, according to an embodiment.

Referring now to the drawings wherein like reference numerals are used to identify identical components and steps in the various views, the Optimal Communication System ("OC system" 10) will be described in detail with reference to FIGS. 1-6.

Figure 2:
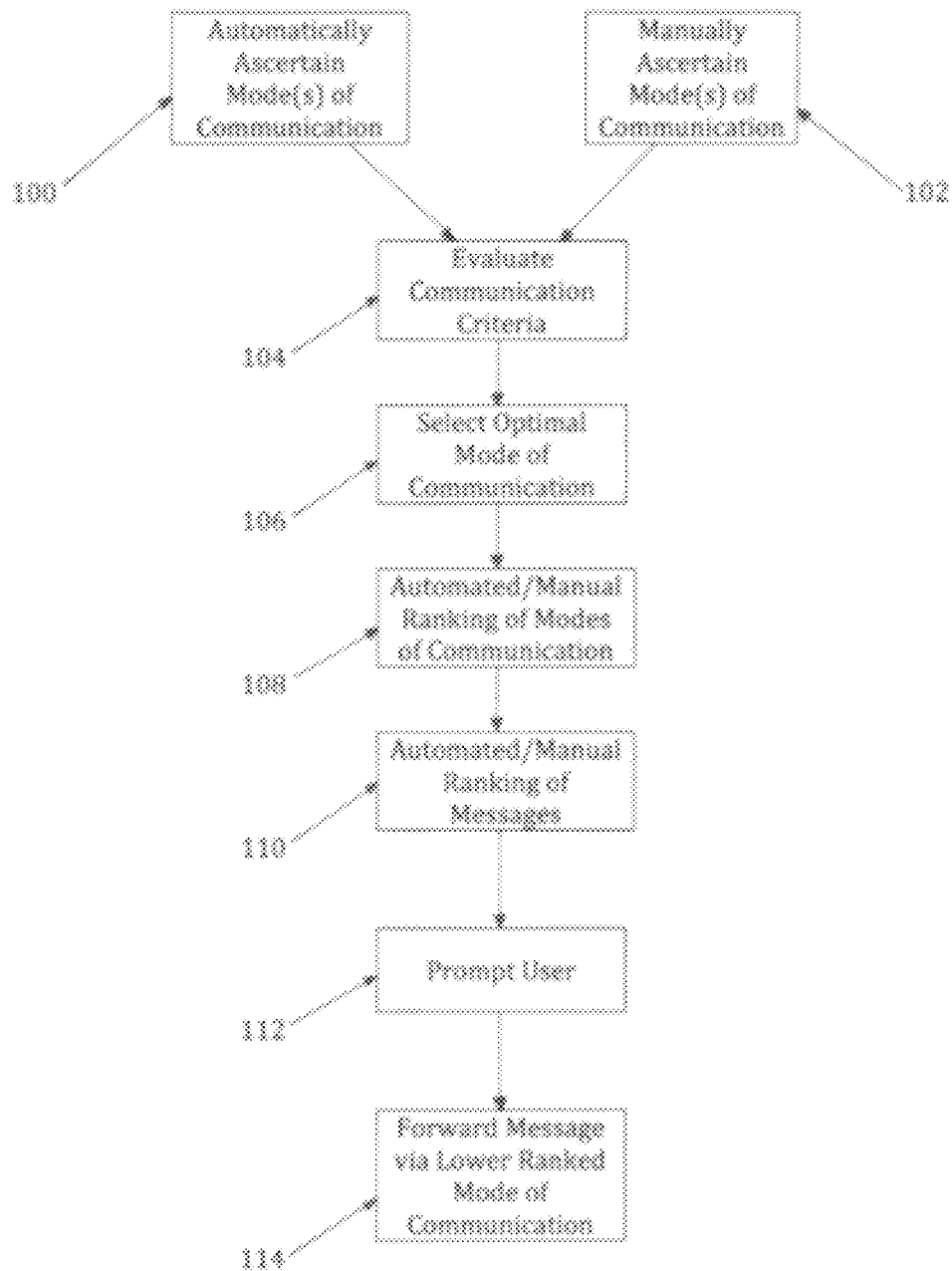
FIG. 2 is a flow-chart of an optimal communication method, according to an embodiment.

Referring to FIGS. 1 and 2, in an embodiment, optimal communication system 10 may include an optimal communication module ("OC module") 12 to ascertain a sender's 14 and recipient's 16 available modes of communication. System 10 may further include, or communicate with, a recipient communication system 18 to allow a message recipient to link at least one communication criterion with a preferred mode of communication, and a sender communication system 20 to allow a sender to send a message to the recipient by means of the recipient's preferred mode of communication. The various systems and sub-systems described herein may be implemented as modules of system 10 or a larger system (not shown) encompassing system 10. The modules and other components of system 10 may include machine readable instructions, hardware or a combination of machine readable instructions and hardware. A data storage may be provided for storing information utilized by the system 10. The data storage may include a database or other type of data management system.

Referring to FIG. 2, a flow-chart of an optimal communication method, according to an embodiment, is illustrated. Each of the functions described below at the various blocks of FIGS. 2-4 may be carried out by modules or combinations of modules that are part of OC module 12, or by separate modules that are part of OC system 10. Each of the functions described below at the various blocks of FIGS. 2-4 may also implement the methods described herein with reference to FIGS. 2-4.

Referring to FIG. 2, at block 100, the OC module may automatically ascertain in real-time a user's (e.g. sender's and receiver's) modes of communication, or alternatively, may manually ascertain a user's modes of communication at block 102 by allowing a user to select a mode of communication from a predetermined list of communication options or enter a specific mode of communication (e.g. a user-defined e-mail address, an application not known to the OC module etc.). For example, the OC module may be operatively connected or otherwise wirelessly linked to a user's modes of communication, such as e-mail, text, phone or another communication application (wired or wireless) to determine the availability of the particular mode of communication. This may allow the OC module to determine subsequent options for communication between a message sender and recipient, and limitations on such communication options.

As discussed above, referring to FIG. 4, recipient communication system 18 may allow a message recipient to link at least one communication criterion with a preferred mode of communication at block 300. Examples of communication criteria may include a time of communication, a sender's or recipient's location, a recipient's relationship with the sender, or generally, a sender's or recipient's specific preference(s) as set by the sender or recipient. As discussed herein, as shown in FIG. 2, these communication criteria may allow the OC module to evaluate at block 104 and then select the optimal mode(s) of communication at block 106 based on the specifics of the message, and its correspondence with the sender's and recipient's communication criterion. For example, assuming a recipient's communication criteria include a preference for e-mail communication between the time of 9:00 am to 5:00 pm, and text communication between the time of 5:01 pm and 10:00 pm, a message sent by a sender at 11:00 am may be automatically forwarded to the recipient's e-mail, whereas the identical message sent at 7:00 pm may be automatically forwarded to the recipient as a text message. Alternatively, as further discussed herein, assuming a recipient's higher ranked communication criteria may include only e-mail communication when located, for example, outside of the U.S. to prevent higher phone/text fees, regardless of the time of communication, all messages forwarded to the recipient may be sent by e-mail. Yet further, a sender may have a preferred communication criterion that only sends texts to a specific recipient when the recipient is located outside of the U.S. based on the sender's past experience of only being able to reach the recipient by text when the recipient is located outside of the U.S. In this manner, regardless of the recipient's preferred communication criteria, if the recipient allows a sender's communication criteria to override the recipient's preferences or sets no preferences, the aforementioned message may be sent via text regardless of the time of communication if the recipient is located outside of the U.S. As discussed herein, a plurality of communication criteria may be ranked or otherwise set in this manner by the sender, recipient, the OC module or an authorized third party to optimize communication. The recipient communication system may include the capability of receiving a message in a particular format regardless of the sender's message format, with the recipient's choice of such communication being based on the recipient's preferences, as well as the recipient's knowledge of the sender and/or the sender's communication preferences. For example, if a sender only prefers to communicate by phone/voicemail, a recipient may by default choose to receive messages in a text format based on their preferences.

Figure 3:
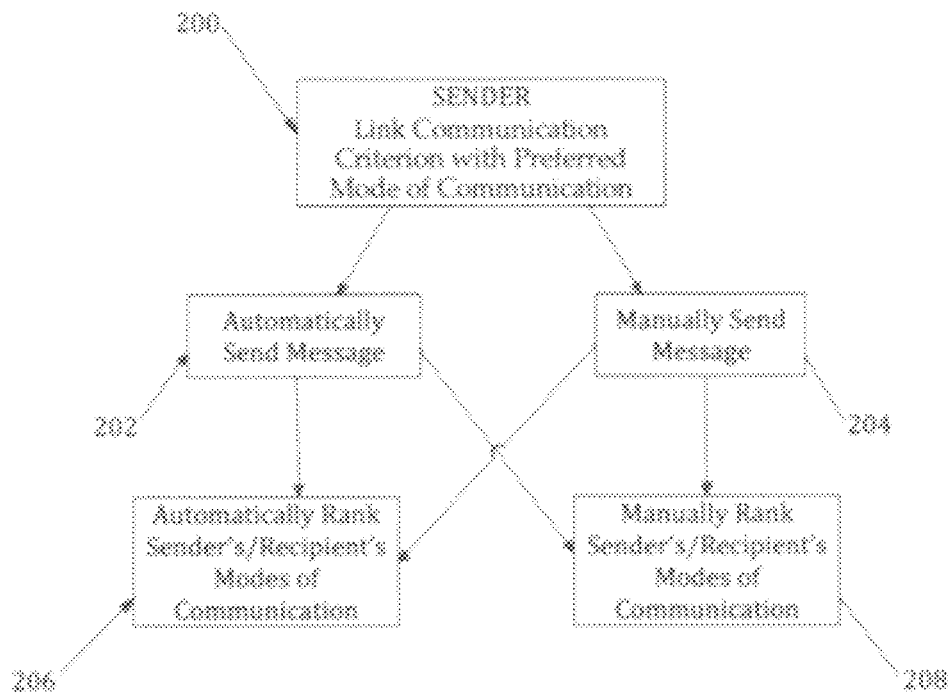
FIG. 3 is a sender-side flow-chart of a sender communication method, according to an embodiment.
Figure 4:
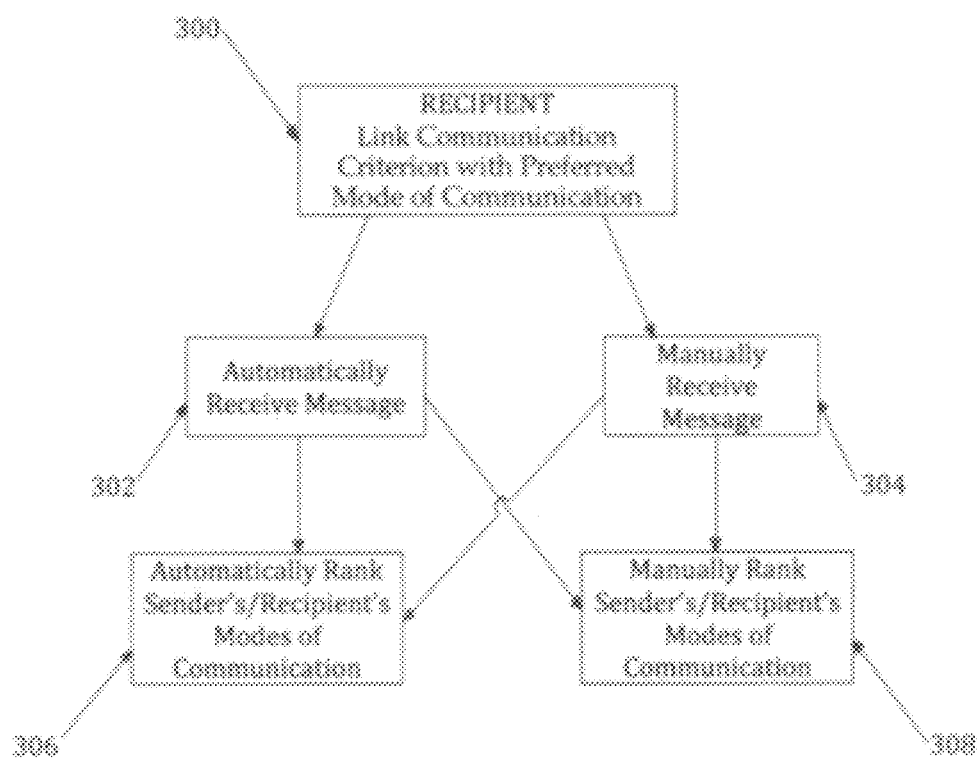
FIG. 4 is a recipient-side flow-chart of a recipient communication method, according to an embodiment.

Referring to FIGS. 3 and 4, sender communication system 20 may allow the sender to automatically send a message at block 202 to the recipient by means of the recipient's preferred mode(s) of communication (or the sender's preset preferred modes of communication if allowed by the recipient or a third party), or manually send a message at block 204 based on the sender's desired mode of communication. However, the recipient communication system may allow the recipient to limit a sender's ability to send a message by means of only the recipient's preferred mode of communication at block 302, with the recipient being able to manually receive messages in a desired manner at block 304 (e.g. a recipient may choose to accept a message in a sender's mode of communication or differently). Thus, as discussed in the example above where a sender may send a message via text if a recipient is located outside of the U.S., regardless of the sender's communication criteria, if the recipient accepts messages by only the recipient's communication criteria (e.g. e-mail from 9:00 am to 5:00 pm, and text from 5:01 pm and 10:00 pm), a sender's communication criteria may not be allowed to override the recipient's preferences (unless otherwise allowed by the OC system or an authorized third party). While a sender may attempt to manually override the recipient's communication criteria preferences, such an override may only be permitted by the recipient. In the case of an employer/employee, parent/child or similar superior/subordinate relationship, a sender or a third party may in-fact have the ultimate authority to override the recipient's communication criteria preferences, as allowed by the OC system.

As shown in FIGS. 2-4, as discussed herein and in the example discussed above, the sender and recipient communication systems may allow ranking of the sender's and/or recipient's modes of communication either automatically at blocks 206, 306 for the sender, recipient, or manually at blocks 208, 308 for the sender, recipient, and at block 108 in the OC module. The rankings at blocks 108, 206, 208, 306 and 308 may be performed before and/or after sending or retrieval of a message, with the before rankings being performed based, for example, on a sender's or recipient's knowledge or preferences of communication modes and options, and the after rankings being performed based on past results of communication in conjunction with the sender's or recipient's knowledge or preferences. For example, a sender may rank their preference of various modes of communication based on their own personal preferences, and may likewise rank a recipient's various modes of communication, if allowed by the recipient or an authorized third party, based on the sender's knowledge of the recipient's past or expected communication techniques or availability. A similar principle may apply to the recipient's abilities to rank their own or the sender's modes of communication. This ranking capability may be tied into a variety of communication criteria as discussed above to allow a message to be sent and received in a preferred communication mode order for thus optimizing communication.

Referring to FIGS. 2-4, in addition to ranking by the sender/recipient, the OC module may allow automated or manual ranking of a message at block 110 based on contents of the message. For example, if a message is sent by a particular sender or may include particular keywords (e.g. party, work, emergency), that particular message may be ranked at a higher or lower level and thus forwarded to the recipient via a respectively higher or lower ranked preferred mode of communication. Thus a message may be categorized based on its contents (e.g. party, work, emergency) to be forwarded to the recipient via a predetermined preferred mode of communication. For example, a message including the word "party" may be forwarded to the recipient via a lower ranked mode of communication such as a personal e-mail address, whereas a message including the word "emergency" may be forwarded to the recipient via a higher ranked mode of communication such as text.

In order to preserve privacy of the recipient, specifics of the recipient's modes of communication may be hidden from the sender (and vice-versa). For example, in a workplace or another setting where a recipient may not wish to disclose the private contact information of an emergency contact to any staff member but may still like for that emergency contact to be contacted in the case of an emergency, the private contact information may be hidden from the sender with a message still being forwarded as needed.

The OC system described herein may be a stand-alone, or part of, for example, an I-PHONE, BLACKBERRY or generally, a PDA or computer application, and may allow cross-communication with a variety of communication applications. For example, when functioning as an I-PHONE application, the OC system may include cross-communication capability with e-mail applications within MICROSOFT EXCHANGE, GOOGLE (G-MAIL), YAHOO MAIL, HOTMAIL, FACEBOOK, and any user-defined or other e-mail or communication account or application generally. In this regard, the OC system may include the capability of exploiting the full capabilities of a particular application. For example, with FACEBOOK where a user may post on an individual's "wall" or correspond via e-mail, the OC system may allow for versatility in communicating with a recipient by either posting on the individual's "wall" or corresponding via e-mail, or yet further, including a posting capability on the FACEBOOK "live chat" window depending on a sender's or recipient's availability and ranking of the preferred mode(s) of communication. This versatility may allow the OC system to use all modes of available communication to allow optimal communication. As an example, for a recipient who has FACEBOOK as an available mode of communication, the recipient (or the OC system) may rank FACEBOOK communication modes in order of higher to lower preference as live-chat, wall posting and e-mail. For a sender wishing to contact a recipient, if the OC module ascertains FACEBOOK as an available mode of communication, a message entered into the OC system may be automatically sent to the recipient's FACEBOOK site as a live-chat message if the recipient is online, or secondarily, sent to the recipient as a wall post if such a mode of communication were to be ranked higher by the recipient. Alternatively, if FACEBOOK is a lower ranked mode of communication, as discussed in the example above, the message may be sent via another one of the recipient's higher ranked and available modes of communication.

Figure 5:
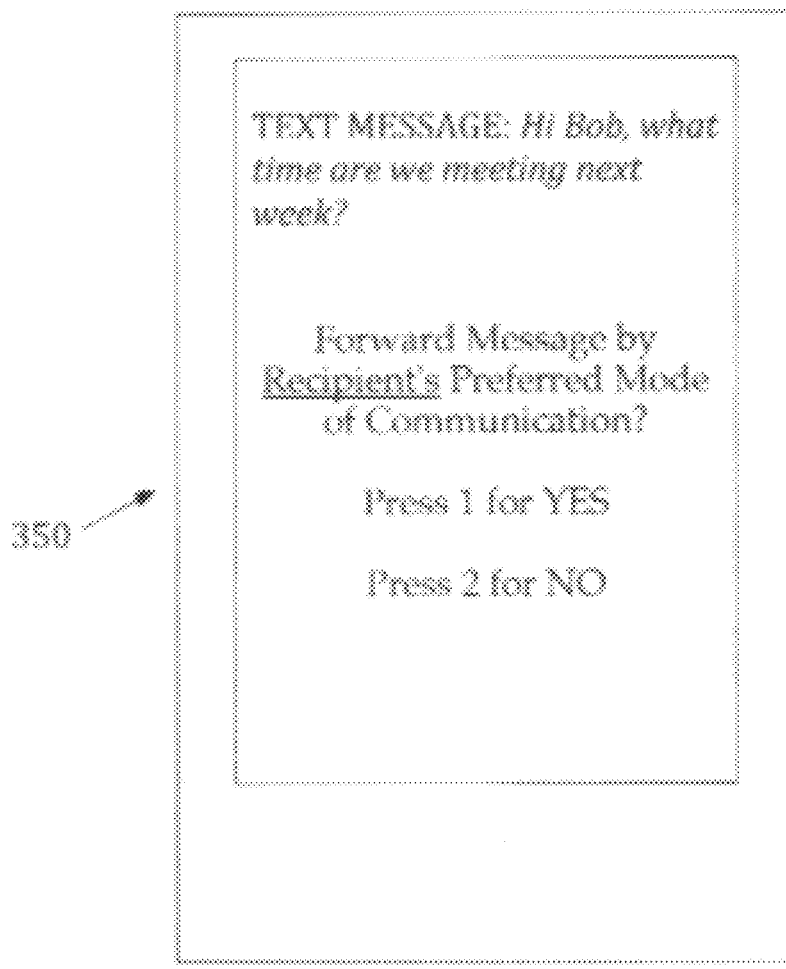
FIG. 5 is a view of a PDA including a prompt according to an embodiment for forwarding a message via a recipient's preferred mode of communication.

The OC system may allow for a user to send a message via the sender's chosen mode of communication (e.g. voice-mail, text, e-mail etc.), but optionally, also may include a separate prompt at block 112 in FIG. 2 and block 350 in FIG. 5 to request whether the user may like the message to be sent via the recipient's preferred mode of communication. Thus, a sender or user who is not familiar with the OC system may send or choose to send a message, for example, via text, and prior to or after sending of the message, the OC system may prompt the user to, for example, send the message via the receiver's preferred mode of communication. In this regard, as shown in FIG. 5, the OC system may prompt, for example, "Forward Message by Recipient's Preferred Mode of Communication? Press 1 for YES. Press 2 for NO," or alternatively, "Recipient Prefers Messages to be sent by "e-mail", Forward Message by "e-mail"? Say YES or NO." Thus, a sender may press "1" or say "YES" when appropriate to automatically send the message by the recipient's preferred mode of communication, where the recipient's name may be appropriately inserted in the message prompt. For an individual with a disability, or for an individual with a preference of a unique prompt, the OC system may allow entry of a individualized prompt for forwarding a message via the recipient's preferred mode of communication. The aforementioned description may be applicable to prompting a message sender to send via their own or an authorized third party's preferred mode(s) of communication as selected by the sender, or by the authorized third party. Such a feature may be optimal for users with lesser familiarity with PDA devices, as well as to allow general ease of use of the OC system. For minimizing bandwidth and device power usage, the aforementioned prompt may occur before a message is sent to avoid forwarding of multiple messages (e.g. a message before and a message after the prompt if the preferred mode of communication differs from the initially selected mode of communication). In this regard, if a sender forwards a message via the recipient's preferred mode of communication, the OC system may remain silent and only prompt the sender as discussed above if the mode of communication was different than the recipient's preferred mode. The OC system however may include the full capabilities of prompting a sender or recipient to send and/or receive a message based on the sender's, recipient's and/or an authorized third party's preferred modes of communication. Yet further, if the sender does not subscribe to the OC system, or does not have capabilities of operating the OC system (e.g. via a limited capability cellular phone), the OC system may send the sender a text or another type of message alerting the sender of the recipient's preferred mode of communication. For computers, the OC system has the capability of prompting an e-mail or another communication system user to communicate via the user's or another user's preferred mode(s) of communication (e.g. by sending an e-mail, or prompting prior to sending an e-mail etc.). For communication via a phone, the OC system has the capability of prompting a user to communicate via the user's or another user's preferred mode(s) of communication (e.g. by prompting prior to initiating a dialed call, by prompting prior to leaving a message, automatically calling a user back to alert of the preferred mode(s) of communication etc.). The afore-described alerting or prompting of a user may also be performed or signaled by an audible sound or visible color change in a user's PDA, computer or other communication device, with the color change being applicable to all users, including those with disabilities or limited abilities to comprehend by means, other than color, audible or other methods.

In order to further optimize communication efficiency, the OC system may monitor and record from previous communication the available bandwidth usage of a message (e.g. particularly with messages including attachments) and forward the message to the recipient based on factors such as available bandwidth or minimal bandwidth usage. For example, with certain e-mails (e.g. HOTMAIL) being limited to 10 mb message size, the OC system only may allow for forwarding of a message if the message is less than 10 mb. For a user with multiple e-mails (e.g. HOTMAIL, G-MAIL etc.), the OC system may forward a message exceeding 10 mb but less than 25 mb to the recipient's G-MAIL account (e.g. having a 25 mb maximum capacity) to insure message delivery, and at the same time, may forward a standardized message alerting the user of such a communication should the HOTMAIL account be a higher ranked preferred mode of communication. In another example, for a recipient who receives multiple such high bandwidth usage messages, the OC system has the capability of forwarding only one such message to a user's preferred e-mail account and only standardized alerts to other accounts to minimize overall bandwidth usage. For users of mobile broadband cards and other such devices that may charge based on bandwidth usage, such optimization may be significant in that a recipient could access one e-mail account for access to all large messages and thus maximize bandwidth usage by not having to access multiple accounts. In this regard the OC system, as discussed herein, may have a stand-alone message window and platform for sending and receiving all messages, regardless of a sender's or receiver's various communication platforms, but still maintains the sender's and receiver's overall communication platform preferences by essentially being an intermediate communication hub between various communication platforms.

The OC system may also allow optimal communication based on minimal power usage of at least one of the user's and recipient's communication devices. For example, for large e-mail messages or messages with large attachments that may require significant power to upload, view or run, based on a sender's or recipient's preferences, a large message may not be viewable if the recipient has initiated a power-save mode. Alternatively, the OC system may prompt a user prior to opening/viewing a large message if opening/viewing such a message may result in significant power consumption. This feature may have benefits for not only power usage of a device operating the OC system, but also general power usage reduction for millions of PDA and other such devices that must be charged on a daily basis.

The OC system also may include a voice transcription software (e.g. DRAGON NATURALLY SPEAKING, DICTATE etc.) for converting a message from voice to text, or alternatively, a text to voice software (e.g. NATURAL VOICES, ACAPELA etc.) for converting a text message to a voice format. In this manner, the OC system may allow full compliance with a sender's and recipient's preferred modes of communication. For example, for a recipient who only prefers written (e.g. text, e-mail etc.) communication as a preferred mode of communication, the OC system may transcribe any voice message from a sender and thus forward only a written message to a recipient. In this regard, for a recipient either known by a message sender to ignore voicemails (e.g. during the day or evening), an optimal way of communicating with such a recipient may be to send a text message, e-mail or another such communication. Likewise, for a recipient who only prefers voice messages, a sender may forward a text, e-mail or another such written message to be delivered to the recipient as a voicemail. In this manner, based on the preferred modes of communication by a sender or recipient, the OC system may allow optimal communication by forwarding messages using voice transcription or text-to-voice software.

The OC system may also allow optimal communication by associating sound, visual stimulation, vibration and/or electrical signal(s) with a message, and may further allow association of such signals by the recipient with a ranking of a message sent by the sender. Such signals may be further used to optimize communication by associating, for example, the specifics of a sender/recipient, contents of a message, time of a message, location of sender/recipient and other user-defined values to alert a sender or recipient of a specific criterion associated with a message. For example, a sender/recipient may associate a specific audible signal with an emergency message. Thus in addition to delivering a message to a recipient by the sender's/recipient's preferred modes of communication for such messages, an audible (or another) signal may be associated with such a message. For user's with disabilities or limitations on communication capabilities, the OC system in association with the aforementioned signals may permit yet another means of optimizing communication. For example, for a blind recipient, an audible signal in conjunction with a message may prompt the user to hear or "feel" a message through touch sensation on a PDA screen or otherwise. In this regard, for a message sender who chooses to unknowingly contact a blind recipient via a text message, the message may be converted to a voice or another communication format selected by the recipient. Although there are many software modules available for converting voice to text or text to voice for individuals with disabilities, the OC system may further allow for alerting the message sender of the recipient's preferred mode(s) of communication for optimizing future communication.

The OC system may also allow a sender (or an authorized third party) to view a recipient's preferred modes of communication, and alternatively, the system may allow a sender to view a recipient's ranked preferred modes of communication prior to sending a message based on contents of the message. Yet further, the OC system may allow a sender to view a recipient's ranked preferred modes of communication prior to sending a message based on a sender's relationship with the recipient. These features may allow a sender or recipient to manually send or respond to a message by choosing a specific mode of communication rather than automatically forwarding a message based on pre-set rankings and/or modes of communication. For example, in case of an emergency, this capability may allow a sender, recipient or an authorized third party to view all of the involved parties' modes of communication to optimize communication.

Referring to FIG. 2, the OC system may include the capability of automatically forwarding a further message at block 114 via a lower ranked sender or recipient preferred mode of communication if the recipient does not acknowledge receipt of an initial message. For example, in the case of an emergency, a message may thus be sent to a recipient by a sender's or recipient's preferred mode(s) of communication, but if a response or acknowledgement is not received within a predetermined time-frame (e.g. 2 minutes), the message may be re-sent by a recipient's lower ranked mode of communication. In this manner, the OC system preserves a goal of optimal communication by ensuring receipt of a message of high importance. Referring to FIG. 2, after forwarding a message, the OC module may revert back to the original steps of ascertaining the user's modes of communication at blocks 100, 102, or at another intermediate process based on user preferences.

Based on the aforementioned real-time operational capabilities, the OC system may operate as a "smart" system, capable of optimizing communication based on a variety of additional factors. For example, for a PDA and other such devices operating the OC system or in conjunction with another system using the OC system, the OC system may monitor the PDA location via GPS or other locating technologies, and further may monitor other real-time variant variables such as sound picked up by the PDA microphone, surrounding light, PDA movement via GPS or locating tracking, PDA altitude, and BLUETOOTH (if available) operation. The OC system may also allow a user to set and select from a plurality of predetermined or user-defined modes of operation. For example, the OC system may include three modes of operation, such as Normal, Silent and Emergency. A user (sender, recipient or authorized third party) may select and maintain the respective modes of operation automatically (e.g. based on time, location or other factors), or may manually select and change a mode of operation.

Assuming the OC system is operating in the "normal" mode of operation, for sound picked up by, for example, the PDA microphone, the OC system may determine if the PDA is at a location with a high surrounding sound level (e.g. a concert, sports event etc.). In this case, the OC system may automatically determine if the message recipient is at a location that may be too loud for a phone conversation or a voicemail, and thus revert to the recipient's lower or differently ranked mode of communication (e.g. text, e-mail etc.). Alternatively, if the OC system detects the PDA device is in a dark or high external light environment, the OC system may revert to a user's lower or differently ranked mode of communication, such as including an electronic or another signal with the communication to alert the user.

The OC system may have the capability of linking onto a recipient's electronic calendar (e.g. home, work etc.), and based on calendar entries, the OC system may revert to a recipient's higher or lower ranked modes of communication. For example, if the OC system is operating in a normal mode of operation for a recipient between 9:00 am to 5:00 pm, if a calendar entry indicates a recipient is at a meeting from 11:00 am to 12:00 pm, the OC system may revert to a recipient's lower or differently ranked mode of communication during this time-frame. Alternatively, if a user has a first mode of communication set from 9:00 am to 5:00 pm, but the GPS capability of the OC system detects user movement outside of the user's work location, the OC system may revert to a user's lower or differently (e.g. non-office) ranked mode of communication.

As discussed above, the GPS or general location capabilities of the OC system may allow it to function in real-time as a smart system. For example, the GPS capabilities may allow the OC system to constantly monitor the location of a PDA or another device operating the OC system. By doing so, the OC system may determine if the recipient or sender is at a location, such as a hospital, library, court, overseas, in a different time zone, or if the user is in movement, such as walking, driving, flying, on a boat etc. This real-time monitoring may allow the OC system to maintain a user-selected mode of communication, or change, in real-time, to a lower or differently ranked mode of communication. For example, for a user at a hospital, library, court or another such controlled environment, the OC system may automatically revert to a lower or differently ranked mode of communication, such as text or e-mail communication, until the user exits the facility. For a user located overseas, as discussed in the example provided earlier, the OC system may likewise automatically revert to a lower or differently ranked mode of communication until the user returns to their home location. For a user located in a different time zone than the user's home time zone, the OC system may revert to a user's lower or differently ranked mode of communication until the user returns home, and may further allow forwarding of communication based on the recipient's current time zone. For a user that is walking, driving, flying or on a boat for example, the OC system may use GPS or general locating technology to detect such movement, and appropriately revert to the user's lower or differently ranked mode of communication. In the particular case of a user that is driving, flying or on a boat where communication may be problematic or unavailable, the OC system may revert to the user's lower or differently ranked mode of communication, such as text communication, or delayed communication until the OC system detects stop of movement of the user (e.g. no longer driving to avoid the risk of diverting the user's attention). The driving based functionality may also be based on operation of a BLUETOOTH or similar technology with the user's PDA, which may alert the OC system whether the PDA is operationally connected to the car and may be safely used to communicate through the car's BLUETOOTH or similar speaker system. The ranking in such a case may also be based on the signal strength of the user's PDA device, or if the user's PDA device is in a power-save mode, the OC system may revert to the user's lower or differently ranked mode of communication.

For other factors, such as the country in which a user is located, the GPS or similar locating capability of the OC system may detect the specific country of presence of the user, and may revert to the user's lower or differently ranked mode of communication. Such a capability may be optimal for user's that frequently travel to various countries, and may be used to update the OC system to appropriately tailor the OC system to a user's preferences based on the specific country of the user's presence. In this regard, the OC system may also advise a sender or receiver (or an authorized third party) as to the location of the user, and their preferred mode of communication. For certain users, whether local or in a different country, the OC system may advise a user of the sender's or recipient's preferred mode of communication, such as the language of communication (e.g. Spanish, Italian etc.).

For a PDA that has been lost or is "dead", the OC system may detect loss of signal for the PDA, or if a user enters, for example, a PDA lost or "dead" entry into the OC system, the OC system may revert to a user's lower or differently ranked mode of communication, such as direct e-mail communication to allow access to messages that may otherwise be sent via voicemail or text, and may require specific efforts on part of the user to retrieve the message via a phone or otherwise.

System 10 may also include scrolling capability to move upper or lower ranked modes of communication higher or lower as desired, before, during or after a particular call or other communication, and to modify the mode of communication at any time. With regard to call location origination, for example, if a call originated at a hospital, then system 10 may automatically revert to a recipient's emergency contact. Alternatively, if a call originated from a hospital phone (located within or outside a hospital facility), then system 10 may revert to a recipient's emergency contact, regardless of whether the call originated from within a hospital facility. This way, if a hospital administrator or personnel made the call, such a call may go to a recipient's preferred emergency contact.

The OC system thus may allow for optimal communication by, for example, ascertaining, monitoring and ranking systems and methods of how people like to communicate and be communicated with. The OC system may thus include an all-in-one system, or a system functional with an existing application, for allowing communication between people without overuse, misuse or incorrect use of resources to allow efficient communication. As discussed herein, the OC system may be applicable and usable with a variety of communication systems, such as PDAs, computers, regular phones (wired or wireless), and generally, any communication system that involves electronic communication. With more and more users having electronic communication devices, the OC system may have implications on minimizing unnecessary bandwidth usage and thus providing efficient communication. With numerous applications and communication methods available in today's electronic world, the OC system may allow for a comprehensive communication application that may allow a user to enter or speak a message and then forward the message to the intended recipient by the sender's and/or the recipient's preferred mode(s) of communication, without any guess-work of how to send a message and if a message has indeed been received, or logging into multiple applications to send a message as prescribed by that particular application.

Figure 6:
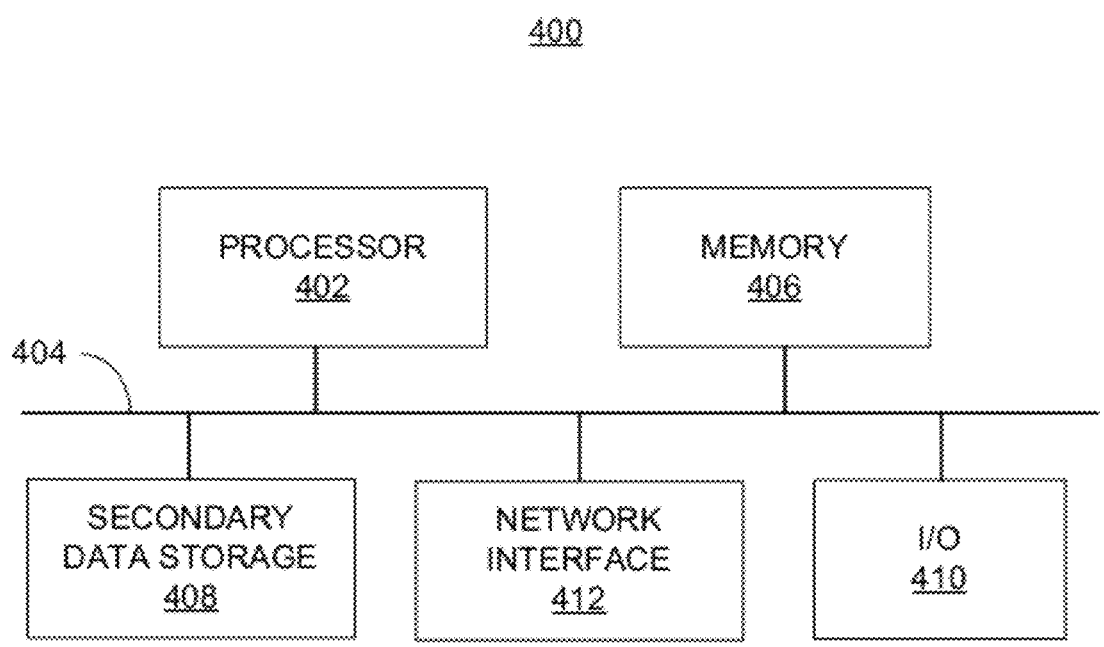
FIG. 6 illustrates a computer system that may be used for the method and system, according to an embodiment.

FIG. 6 shows a computer system 400 that may be used with the embodiments described herein. The computer system 400 represents a generic platform that may include components that may be in a server or another computer system. The computer system 400 may be used as a platform for the system 10. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g. RAM (random access memory), ROM (read only memory), EPROM (erasable, programmable ROM), EEPROM (electrically erasable, programmable ROM), hard drives, and flash memory).

The computer system 400 may include a processor 402 that may implement or execute machine readable instructions performing some or all of the methods, functions and other processes described herein. Commands and data from the processor 402 are communicated over a communication bus 404. The computer system 400 also may include a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums.

The computer system 400 may include an I/O device 410, such as a keyboard, a mouse, a display, etc. The computer system 400 may include a network interface 412 for connecting to a network. Other known electronic components may be added or substituted in the computer system 400.

Although several embodiments have been described above with a certain degree of particularity, those skilled in the art may make numerous alterations to the disclosed embodiments. All directional references (e.g., upper, lower, upward, downward, left, right, leftward, rightward, top, bottom, above, below, vertical, horizontal, clockwise and counter-clockwise) are only used for identification purposes to aid the reader's understanding, and do not create limitations, particularly as to the position, orientation, or use. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not as limiting.

What is claimed is:

1. A first user communication device comprising:
a memory storing machine readable instructions to:
ascertain available modes of communication for the first user communication device;
link a communication criterion with a preferred mode of communication from the available modes of communication for the first user communication device;
receive, from a second user communication device, a message via the preferred mode of communication for the first user communication device;

receive, from the second user communication device, an acknowledgement request related to the message via the preferred mode of communication for the first user communication device;
receive, from the second user communication device, a further message via a lower ranked mode of communication compared to the preferred mode of communication absent receipt, by the second user communication device, of an acknowledgement receipt related to the acknowledgement request; and
receive, from the second user communication device, an additional message after the further message via a higher ranked mode of communication compared to the lower ranked mode of communication upon reverting of the second user communication device to the higher ranked mode of communication for forwarding the additional message after the further message; and
a processor to implement the machine readable instructions.

2. The first user communication device according to claim 1, wherein the modes of communication include e-mail, text, and voicemail, further comprising machine readable instructions to:
convert the message received via the preferred mode of communication for the first user communication device from one of the modes of communication specific to the second user communication device to a different one of the modes of communication specific to the first user communication device.

3. The first user communication device according to claim 1, further comprising machine readable instructions to:
monitor sound in an area around at least one of the first and second user communication devices; and
select one of the available modes of communication based on the monitored sound.

4. The first user communication device according to claim 1, wherein the message received via the preferred mode of communication for the first user communication device includes an e-mail, further comprising machine readable instructions to:
prompt a user prior to opening the e-mail based on a determination of whether a power consumption of the first user communication device associated with opening the e-mail exceeds a predetermined power consumption level.

5. The first user communication device according to claim 1, further comprising machine readable instructions to:
select a plurality of modes of communication from the available modes of communication based on available bandwidth; and
select a mode of communication, from the plurality of selected modes of communication, that minimizes bandwidth usage.

6. The first user communication device according to claim 1, further comprising machine readable instructions to:
select one of the available modes of communication; and
send an alert to the first user communication device via the preferred mode of communication if the selected mode of communication is different than the preferred mode of communication.

7. The first user communication device according to claim 1, wherein the communication criterion includes a location based on a type of building.

8. The first user communication device according to claim 1, wherein the communication criterion includes a location based on a name of a geographical location.

9. The first user communication device according to claim 1, further comprising machine readable instructions to:
select one of the available modes of communication based on a language of communication that includes English and a spoken language different than English, wherein the available modes of communication include at least two of e-mail, text, and voicemail.

10. The first user communication device according to claim 1, further comprising machine readable instructions to:
override the first user communication device preferred mode of communication based on an authority associated with the second user communication device.

11. The first user communication device according to claim 1, further comprising machine readable instructions to:
monitor surrounding light in an area around at least one of the first and second user communication devices;
select one of the available modes of communication based on the monitored surrounding light, wherein the available modes of communication include at least two of e-mail, text, and voicemail; and
select a different mode of communication compared to the select one of the available modes of communication based on changes in the monitored surrounding light.

12. The first user communication device according to claim 1, further comprising machine readable instructions to:
select one of the available modes of communication based on a lost status indication that is received from at least one of the first and second user communication devices.

13. The first user communication device according to claim 1, further comprising machine readable instructions to:
select one of the available modes of communication based on a power status of at least one of the first and second user communication devices.

14. The first user communication device according to claim 13, wherein the available modes of communication include at least two of e-mail, text, and voicemail.

15. The first user communication device according to claim 1, wherein the higher ranked mode of communication is the preferred mode of communication for the first user communication device.

16. The first user communication device according to claim 1, wherein the first user communication device is one of a phone, a tablet, and a personal computer, and the second user communication device is one of a different phone, a different tablet, and a different personal computer.

17. The first user communication device according to claim 1, wherein the communication criterion includes one of a time of communication, a relationship of a user associated with the first user communication device with a user associated with the second user communication device, a preference of the user associated with the first user communication device, and a preference of the user associated with the second user communication device, further comprising machine readable instructions to:
select, based on the communication criterion, one of the available modes of communication as the preferred mode of communication, or as the lower ranked mode of communication.

18. The first user communication device according to claim 1, wherein the machine readable instructions to receive, from a second user communication device, a message via the preferred mode of communication for the first user communication device further comprise machine readable instructions to:

convert the message from one of the modes of communication specific to the second user communication device to the preferred mode of communication for the first user communication device.

19. A non-transitory computer readable medium having stored thereon machine readable instructions for communication between first and second user communication devices, the machine readable instructions when executed cause a processor to:
- ascertain available modes of communication for the first user communication device;
- ascertain a preferred mode of communication from the available modes of communication for the first user communication device;
- forward, from the second user communication device to the first user communication device, a message via the preferred mode of communication for the first user communication device;
- forward, from the second user communication device to the first user communication device, an acknowledgement request related to the message via the preferred mode of communication for the first user communication device;
- forward, from the second user communication device to the first user communication device, a further message via a lower ranked mode of communication compared to the preferred mode of communication absent receipt, by the second user communication device, of an acknowledgement receipt related to the acknowledgement request; and
- forward, from the second user communication device to the first user communication device, an additional message after the further message via a higher ranked mode of communication compared to the lower ranked mode of communication upon reverting of the second user communication device to the higher ranked mode of communication for forwarding the additional message after the further message.

20. A communication method comprising:
- ascertaining, by a processor, available modes of communication for a first user communication device;
- linking a communication criterion with a preferred mode of communication from the available modes of communication for the first user communication device;
- receiving, from a second user communication device, a message via the preferred mode of communication for the first user communication device;
- receiving, from the second user communication device, an acknowledgement request related to the message via the preferred mode of communication for the first user communication device;
- receiving, from the second user communication device, a further message via a lower ranked mode of communication compared to the preferred mode of communication absent receipt, by the second user communication device, of an acknowledgement receipt related to the acknowledgement request; and
- receiving, from the second user communication device, an additional message after the further message via a higher ranked mode of communication compared to the lower ranked mode of communication upon reverting of the second user communication device to the higher ranked mode of communication for forwarding the additional message after the further message.

21. The first user communication device according to claim 1, wherein the machine readable instructions to receive, from the second user communication device, a further message via a lower ranked mode of communication compared to the preferred mode of communication absent receipt, by the second user communication device, of an acknowledgement receipt related to the acknowledgement request, further comprise machine readable instructions to:
- receive, from the second user communication device, the further message via the lower ranked mode of communication compared to the preferred mode of communication absent receipt, by the second user communication device, of the acknowledgement receipt related to the acknowledgement request within a. predetermined time-frame.

22. The non-transitory computer readable medium according to claim 19, wherein the machine readable instructions when executed further cause the processor to:
- forward, from the second user communication device to the first user communication device, the further message via the lower ranked mode of communication compared to the preferred mode of communication absent receipt, by the second user communication device, of the acknowledgement receipt related to the acknowledgement request within a predetermined time-frame.

* * * * *